United States Patent [19]

Burkard

[11] Patent Number: 4,794,952

[45] Date of Patent: Jan. 3, 1989

[54] COMBINATION MIXING VALVE AND APPLIANCE VALVE ASSEMBLY

[75] Inventor: Bernhard Burkard, Bremm, Fed. Rep. of Germany

[73] Assignee: American Standard, New York, N.Y.

[21] Appl. No.: 150,177

[22] Filed: Jan. 29, 1988

[30] Foreign Application Priority Data

Feb. 4, 1987 [DE] Fed. Rep. of Germany ....... 3703239
Feb. 4, 1987 [DE] Fed. Rep. of Germany ... 8701712[U]

[51] Int. Cl.⁴ .............................................. F16K 11/06
[52] U.S. Cl. ................................ 137/597; 137/625.11; 137/625.46
[58] Field of Search ............... 137/597, 625.18, 625.46

[56] References Cited

U.S. PATENT DOCUMENTS

| 1,680,893 | 8/1928 | Low | 137/625.46 |
| 3,085,594 | 4/1963 | Spragens | 137/597 X |
| 3,433,264 | 3/1969 | Parkison | 137/625.17 |
| 3,513,981 | 5/1970 | Mendelow | 137/625.18 X |
| 4,705,074 | 11/1987 | Olsson et al. | 137/625.46 |
| 4,706,709 | 11/1987 | Monch | 137/597 |

FOREIGN PATENT DOCUMENTS 0071729 6/1962 European Pat. Off. .
2523220 12/1976 Fed. Rep. of Germany ...... 137/597

Primary Examiner—Martin P. Schwadron
Assistant Examiner—Stephen M. Hepperle
Attorney, Agent, or Firm—James J. Salerno, Jr.; Robert G. Crooks; John P. Sinnott

[57] ABSTRACT

The invention relates to a combination single-handle mixing valve and appliance valve assembly, mounted in a common housing and having common hot and cold water connections. The appliance valve, axially positioned between the mixing valve cartridge and the manifold, is in fluid communication with the mixing valve and includes a handle to supply water to the appliance.

9 Claims, 10 Drawing Sheets

FIG. 11
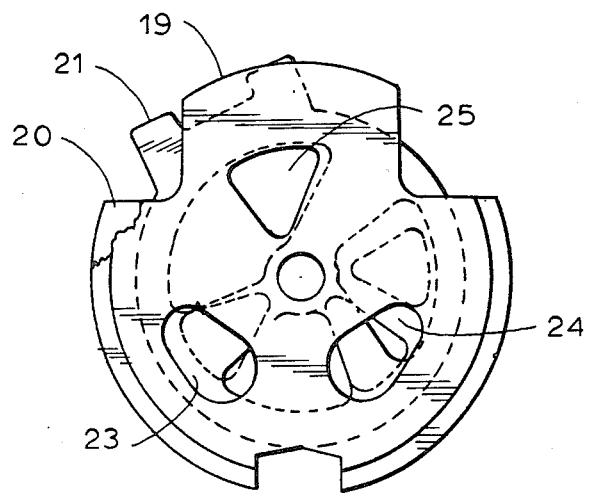
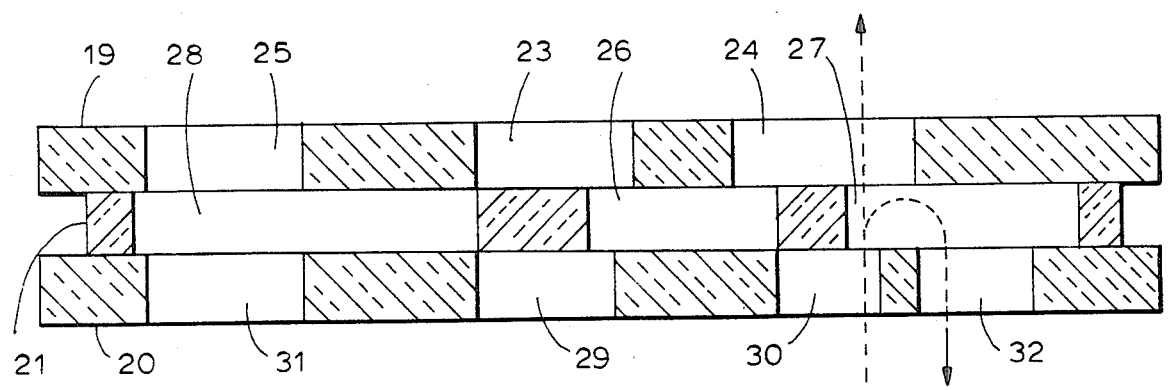
FIG. 12

F I G. 13
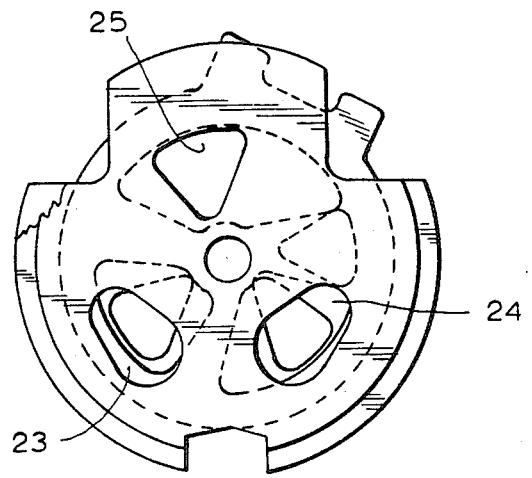
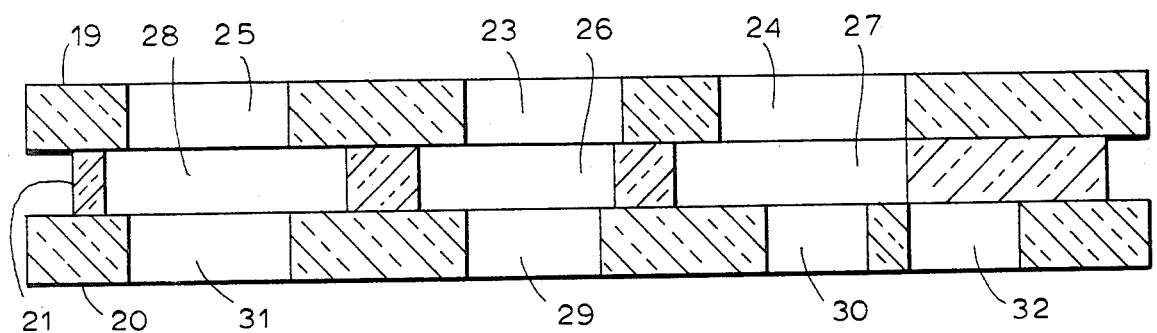
F I G. 14

COMBINATION MIXING VALVE AND APPLIANCE VALVE ASSEMBLY

BACKGROUND OF THE DISCLOSURE

1. Field of the Invention

The invention relates to a single handle mixing valve for kitchen sinks or the like and, particularly, to the type of mixing valves which include in combination an appliance valve and a sanitary valve for domestic use.

2. Description of the Prior Art

Mixing valves of the present type are known, such as is shown in U.S. Pat. No. 4,706,709 which describes, in combination, a mixing valve for domestic use and an appliance assembly. The appliance valve assembly is concentrically mounted within the body of the mixing valve wherein both valve assemblies are connected to a common cold and hot source to supply water to the appliance and for domestic use. Such a valve, while dependable in operation, requires an increased diameter which gives bulkiness to the finished valve assembly.

SUMMARY OF THE INVENTION

An object of the invention is to provide a combination mixing valve and appliance valve assembly wherein the valve assemblies are not concentrically mounted but are in axial alignment and which utilize a common hot and cold water source.

Another object of the invention is to provide a combination mixing valve and appliance valve assembly which is simple in construction and dependable in operation. The mixing valve, in accordance with the present invention, includes a mixing valve for supplying hot and cold water or mixtures thereof to the user, and an appliance valve assembly which is axially aligned therewith and which is mounted in a common housing in which the water source is also common. Preferably, both the mixing valve assembly and appliance valve assembly are in the form of a cartridge. The mixing valve assembly is operated by a single handle while the appliance valve is operated by a handle concentrically mounted on the body of the housing. The appliance valve is arranged and constructed to deliver water to the mixing valve whether the appliance valve is in its opened or closed positions.

BRIEF DESCRIPTION OF THE DRAWINGS

FIG. 11 is a top plan view of the two stationary discs and one movable disc of the appliance valve in its opened position;

FIG. 12 is a linear representation of FIG. 11 showing the water path through the various ports of the three discs;

FIG. 13 is a view similar to FIG. 11 showing the movable disc of the appliance valve in its closed position; and FIG. 14 is a view similar to FIG. 12 showing water path through the hot, cold and mixed water ports of the three discs in the appliance valve.

DETAILED DESCRIPTION OF THE PREFERRED EMBODIMENT

Figure 1:
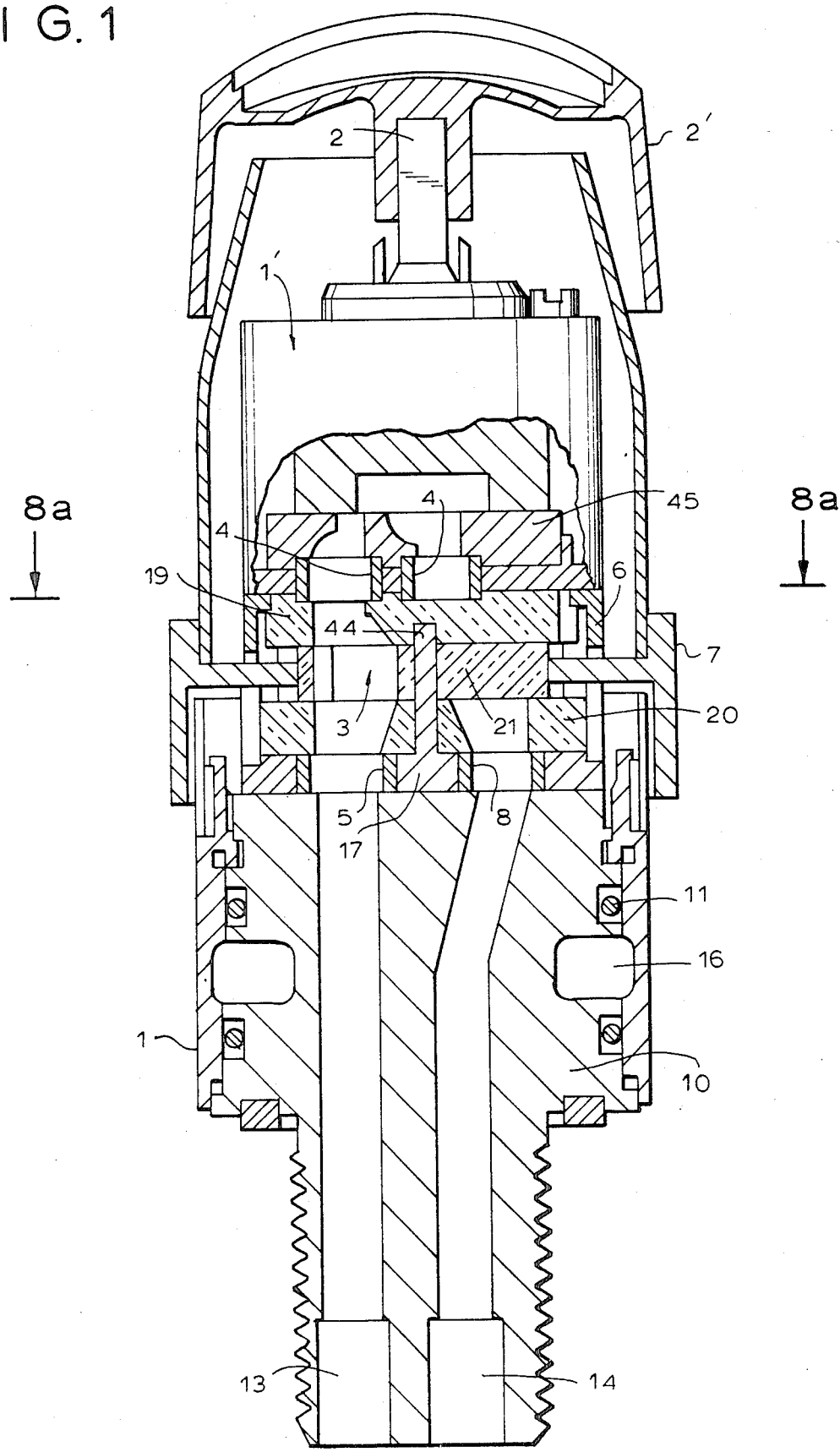
FIG. 1 is an elevational view, partly in section, of the assembly of the mixing valve of the invention herein.

A valve assembly, shown in FIG. 1, includes a valve cartridge 1' for mixing hot and cold water for domestic use and is of the type shown in German Public Disclosure No. 1 550 060 which corresponds to U.S. Pat. No. 3,433,264. Valve cartridge 1', mounted to valve housing 1, includes a control lever 2 on which is mounted handle 2' to operate the valve assembly. A manifold 10 is mounted to valve housing 1 in watertight seal by seal rings 11 and includes a hot water passage 13, a cold water passage 12, appliance passage 14 and water discharge passage 16. Manifold 10 also includes a mixed water outlet 16, not shown, which is in fluid communication with valve cartridge 1'.

Mounted in watertight, sealing engagement between manifold 10 and valve cartridge 1' is appliance valve cartridge 3. Resilient seal rings 4 are mounted around hot water, cold water and mixed water openings in the base of valve cartridge 1' and the corresponding openings in the top of appliance cartridge 3.

Similar resilient seal rings 5 are mounted in the base of appliance cartridge 3 and the corresponding openings in manifold 10. Appliance cartridge 3 includes an appliance discharge opening around which is mounted a resilient ring 8.

Figure 2:
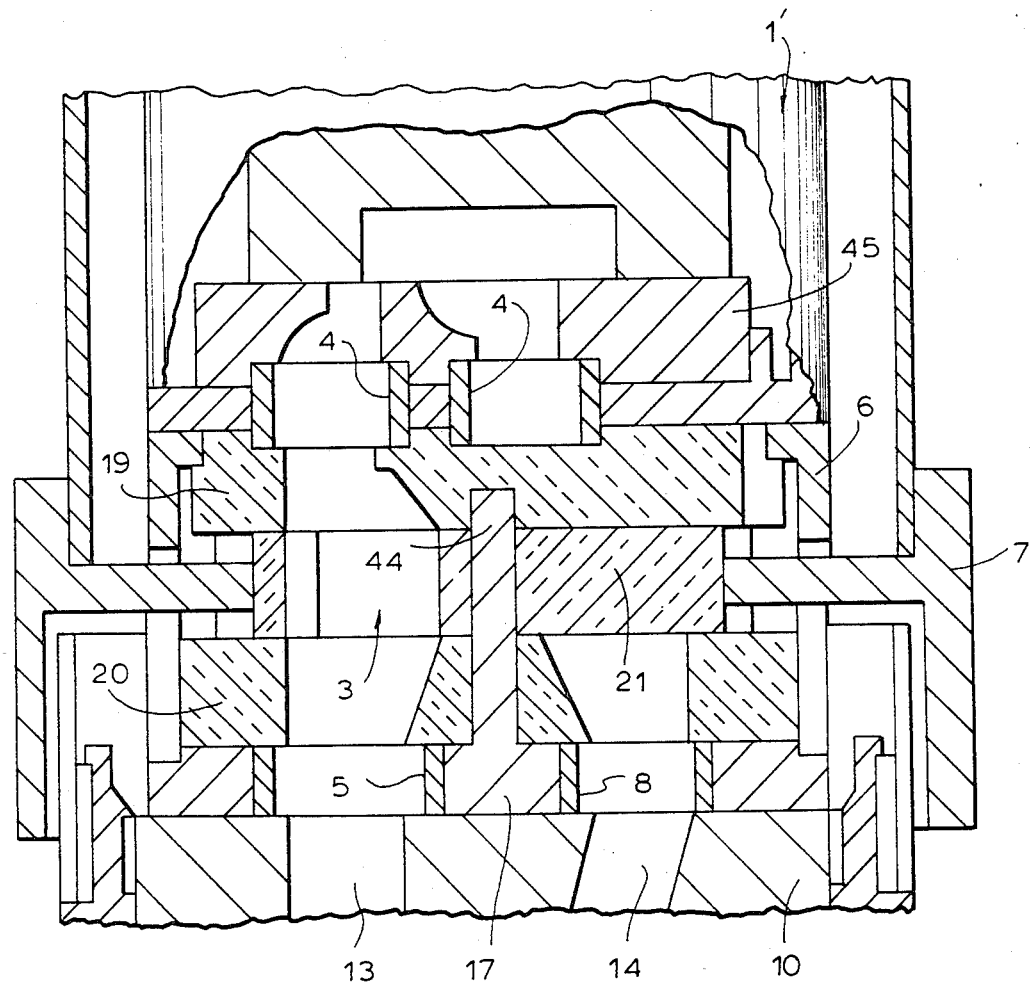
FIG. 2 is an enlarged fragmentary sectional view of the appliance valve shown in FIG. 1.
Figure 3:
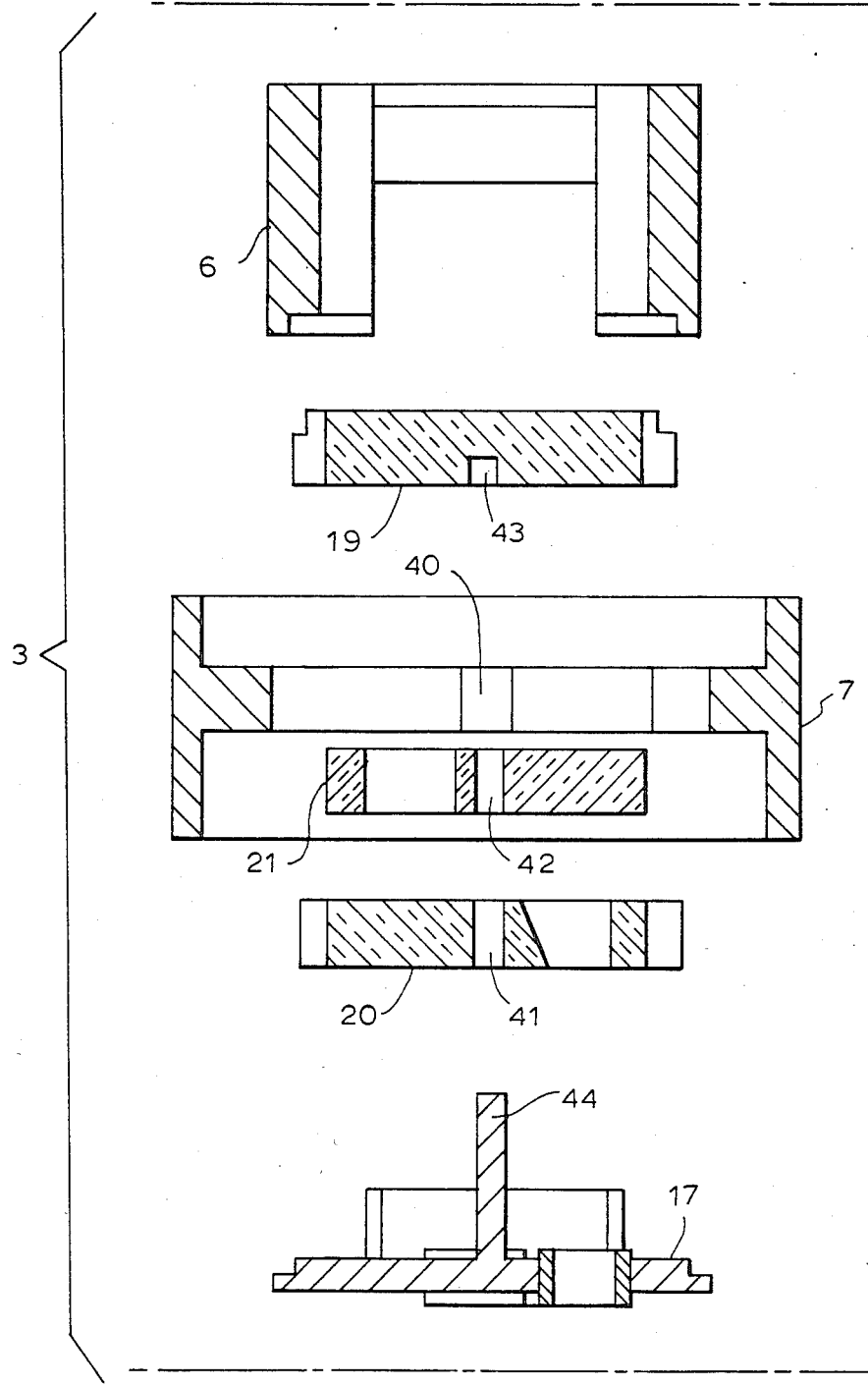
FIG. 3 is an exploded sectional view of the appliance valve shown in FIG. 2.
Figure 4:
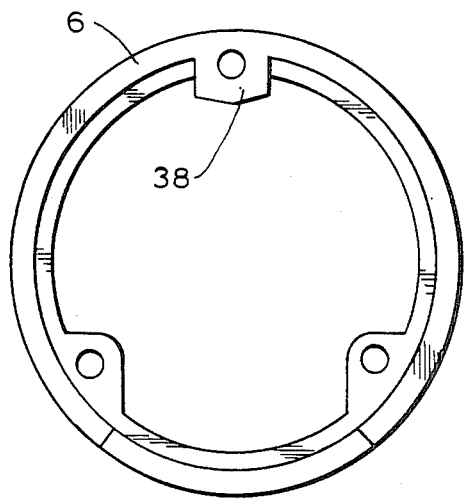
FIG. 4 is a top plan view of the appliance cartridge housing shown in FIG. 3.
Figure 5:
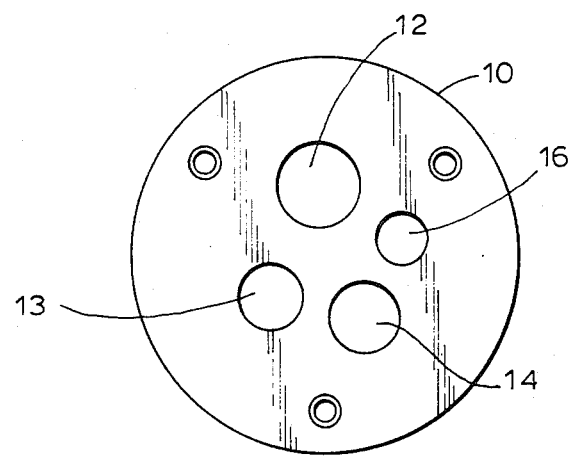
FIG. 5 is a top plan view of the manifold shown in FIG. 1.

FIGS. 2 and 3 illustrate appliance cartridge housing 6 with appliance cartridge head 17, mounted to housing 6 as by ultrasonic welding. Positioned in appliance valve 3 is top stationary ceramic disc 19, bottom stationary ceramic disc 20, and middle rotatable ceramic disc 21; each disc 19,20,21 is arranged in appliance housing 6 with axial clearance. The mutual tight contact of discs 19,20,21 is assured by the tension of the sealing rings between appliance valve 3 and valve cartridge 1' and between appliance valve 3 and manifold 10. A rotary ring 7 rotates movable disk 21 for opening and closing the appliance connection.

Figure 6:
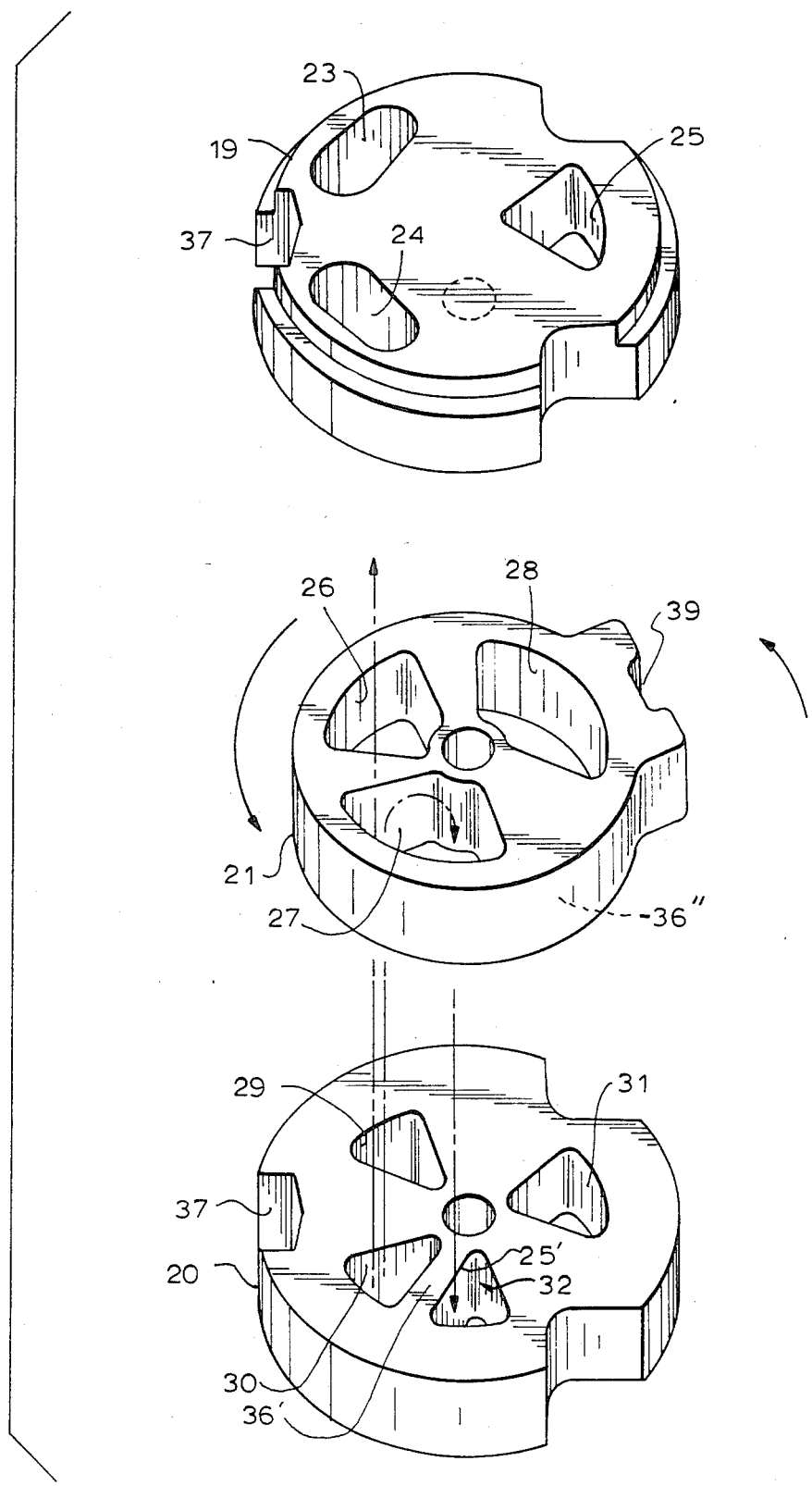
FIGS. 6 and 7 are exploded views of the appliance valve discs shown in their opened and closed positions, respectively.
Figure 9:
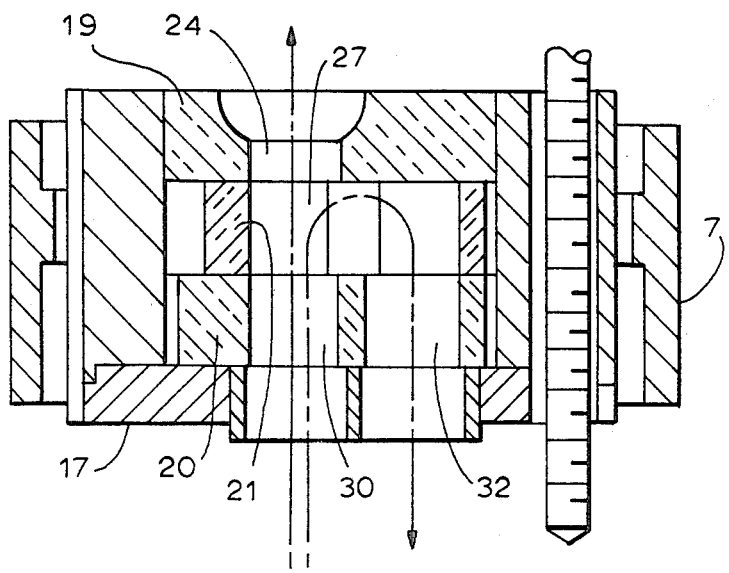
FIGS. 9 and 10 are elevational views, in section, of the appliance valve assembly showing, in the direction of the arrows, water flow both in the opened and closed positions, respectively.
Figure 10:
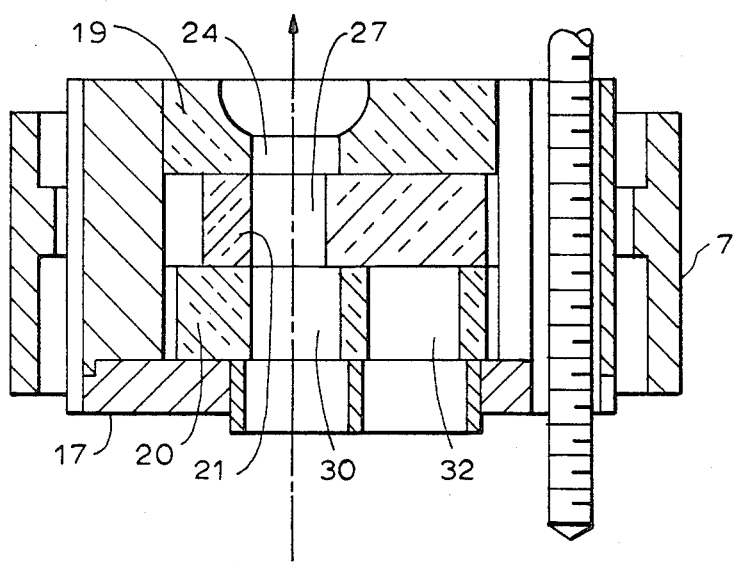

Shown in detail in FIGS. 7-14 are discs 19-21 of appliance valve 3 and their arrangement and configuration. Top disc 19 is provided with a port 23 for hot water, a port 24 for cold water and a port 25 for mixed water. Middle disc 21 is provided with a large port 26 for hot water, a large port 27 for cold water and a large port 28 for mixed water. Bottom disc 20 has a port 29 for hot water, a port 30 for cold water, a port 31 for mixed water and an additional cold water passage 32 for the appliance connection. All ports 23-32 are more or less in the shape of circular sectors or triangles. In FIGS. 6 and 9, bottom disc 20 is shown in a position in which sealing surface 36' of passage 32 to the appliance is in its opened position when disc 21 is rotated in the detection of the arrow. Passages 23,24,25,29,30,31 are so dimensioned and arranged, one above another, are not closed and do not affect the appliance connection when middle disc 21 is rotated to its opened and closed positions. By rotating middle disc 21, only passage 32 is opened and closed, while the passages for operation of valve cartridge 1' are unaffected.

Figure 7:
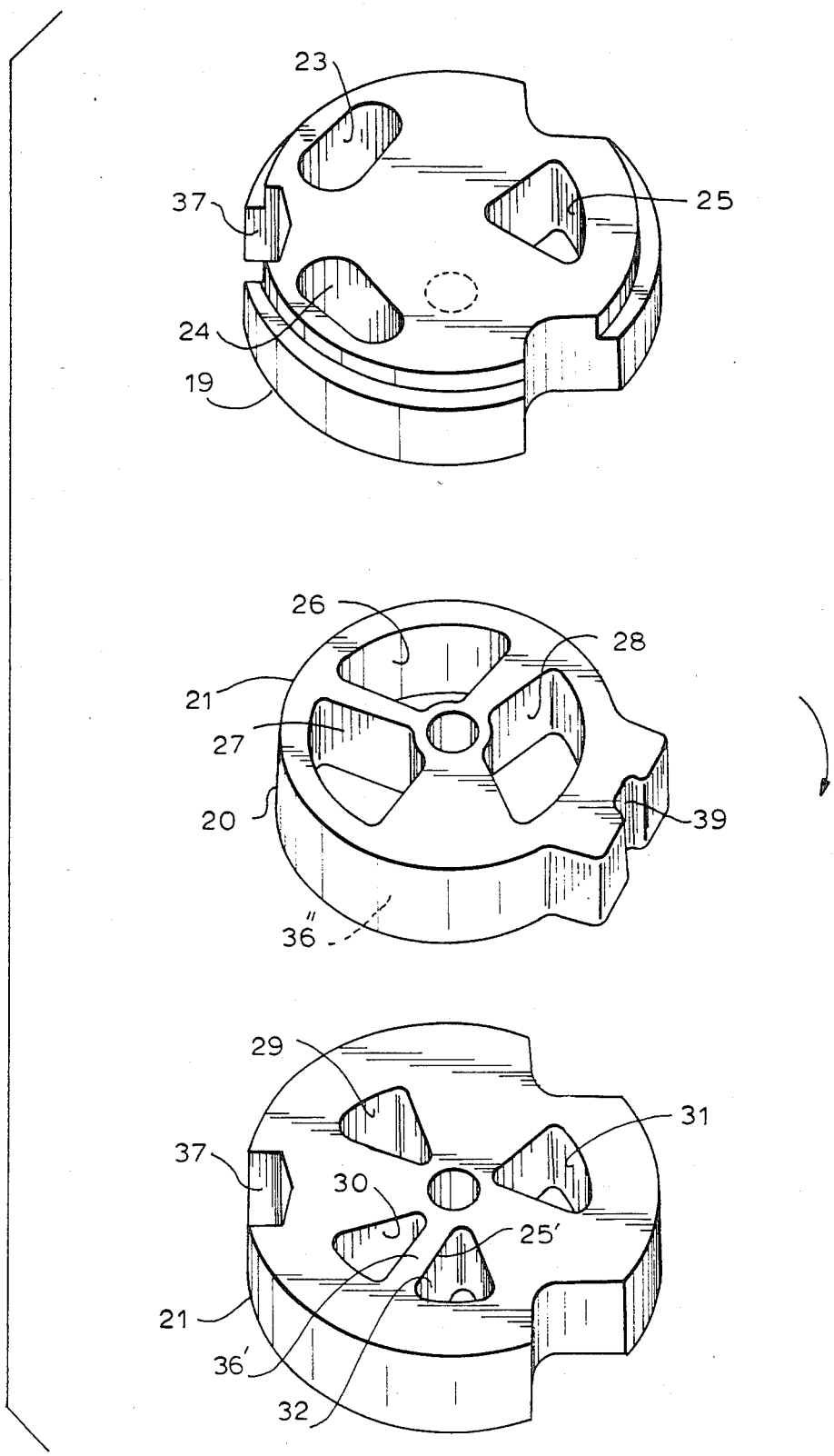
Figure 8A:
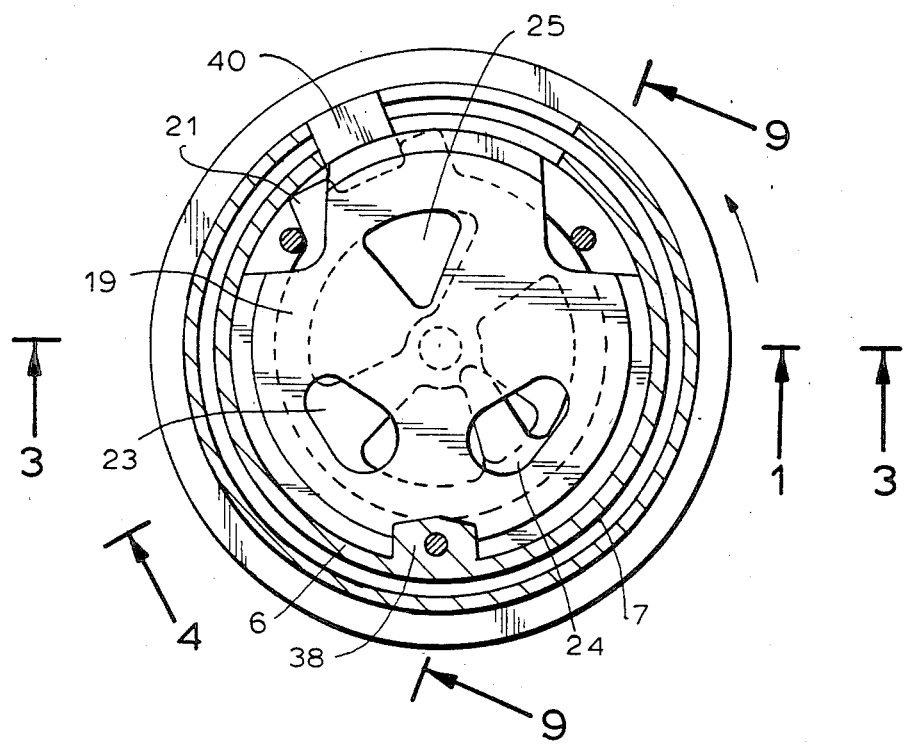
FIGS. 8A and 8B are sectional views taken along the lines 8A—8A of FIG. 1.
Figure 8B:
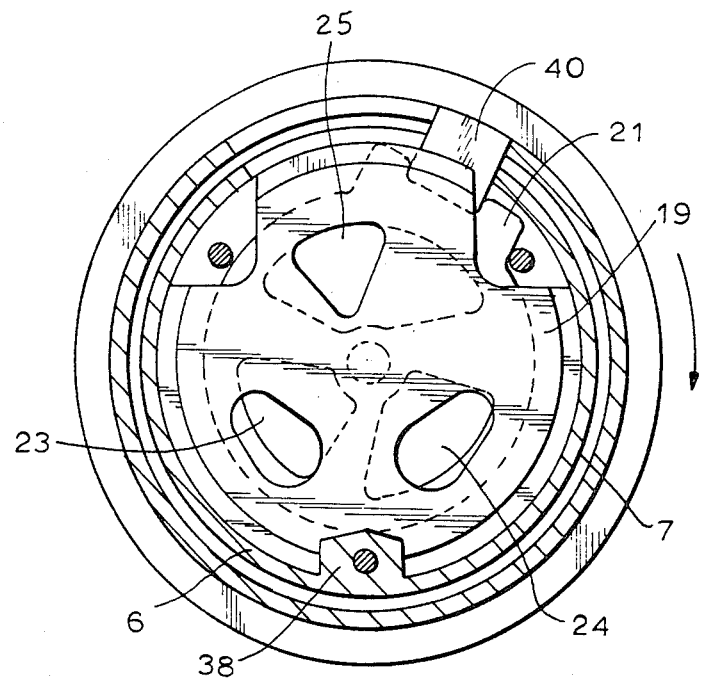

In FIG. 7, middle disc 21 is illustrated rotated in the direction of the arrow. Face area 36" then covers passage 32 so that the appliance connection is closed, shown in FIG. 10. Passages 26,27,28 in disc 21 are enlarged relative to passages 23–25 and 29–32 of stationary discs 19 and 29, respectively.

As previously stated, the embodiment represented and described is only an example of the practice of the invention, and the latter is not limited thereto, rather, there are other possibilities within the scope of the invention, particularly as to the shape and arrangement of the several parts. Thus, instead of rotary ring 7, a toggle or slide switch might be employed. Valve housing 1 would then require a corresponding aperture. Further, the additional port of appliance valve 3 might, alternatively, handle mixed or hot water, and several additional ports might be provided for connecting a plurality of appliances. Between passages 30,32, there is a partition 25', the top surface of which forms a sealing surface 36' to cooperate with face area 36" of disc 21. Further, at least the mutually facing surfaces of ceramic discs 19,21,20 are polished, and they form sealing surfaces 36'. As may also be seen, discs 19,20 have recesses 37 to be engaged by projections 38 on cartridge 6 to secure its position. Recess 39 in movable disc 21 matches a corresponding projection 40 of rotary ring 7. Apertures 41 and 42 in discs 20,21 and recess 43 in disc 19 serve to accommodate a bearing pin 44 for rotary motion of disc 21. Finally, a mixer valve according to the invention, using an appliance valve, might also be employed for a tub-shower switch or to connect an oral spray to the water tap in a washstand model. An appliance valve according to the invention might alternatively be a direct component of valve cartridge 1'. In that case, top stationary disc 19 would be dispensed with since its function might be additionally performed by bottom stationary valve seat disc 45 of valve cartridge 1'. In such a design, in other words, the functions of valve cartridge 1' and those of appliance valve 3 would be structurally united in one cartridge housing only, with a resulting saving of overall height. Appliance cartridge head 17 with seals could be omitted and valve cartridge 1' with its seals would be common to both valve assemblies.

It is claimed:

1. In combination comprising:
    a mixing valve assembly of the single handle type and an appliance valve assembly;
    a housing mounted to a manifold;
    said manifold including hot and cold water passages to connect to a source of hot and cold water, a mixed water passage to discharge hot and/or cold water through said mixing valve assembly, and at least one passage to connect to an appliance;
    said mixing valve and appliance valve assembly is axially positioned in said housing and mounted to said manifold in watertight connection;
    said mixing valve assembly having hot and cold water inlets and a mixed water outlet operably coupled in watertight connection to corresponding passages in said appliance valve assembly;
    said appliance valve assembly including top and bottom stationary discs having hot and cold water ports and a mixed water port formed therein, said bottom stationary disc including an appliance outlet port coupled in watertight connection to said appliance outlet passage in said manifold, and a rotatable disc disposed between said top and bottom stationary discs in sealing relation therewith, and including hot and cold water ports and a mixed water port; and
    an actuating means mounted on said housing and operably coupled to said rotatable disc so that when rotated, said disc is shifted between its opened and closed positions for delivering water to said appliance.

2. The assembly of claim 1 wherein said mixing valve assembly is in the form of a cartridge.

3. The assembly of claim 1 wherein said appliance valve assembly is in the form of a cartridge.

4. The assembly of claim 1 wherein said top, bottom and rotatable discs of said appliance valve are formed having ports which are generally triangular shaped.

5. The assembly of claim 1 wherein said appliance port and hot water port are separated by a partition, at least the upper surface thereof forms a sealing surface cooperating with the corresponding sealing surface of said rotatable disc.

6. The assembly of claim 3 wherein said hot, cold and mixed water ports of said top stationary disc of said appliance valve assembly are coupled to corresponding ports of said mixing valve assembly.

7. The assembly of claim 1 wherein said actuating means is in the form of a ring mounted around the outer surface of said housing and is operably coupled to said appliance valve cartridge.

8. The assembly of claim 3 wherein said appliance cartridge includes a cartridge housing, a cartridge head having an axial pin mounted thereon, said bottom disc and said rotary disc having an axial passageway formed therein, said top disc having an axial recess so that said top, rotatable disc and said bottom disc are axially mounted on said pin with said rotatable disc operably coupled to said actuating means.

9. The assembly of claim 3 wherein said ports formed in said rotatable disc are of a greater cross-sectional area than the ports formed in the top and bottom stationary discs.

* * * * *